(12) United States Patent
Glossner, III et al.

(10) Patent No.: US 7,467,288 B2
(45) Date of Patent: *Dec. 16, 2008

(54) VECTOR REGISTER FILE WITH ARBITRARY VECTOR ADDRESSING

(75) Inventors: Clair John Glossner, III, Carmel, NY (US); Erdem Hokenek, Yorktown Heights, NY (US); David Meltzer, Wappingers Falls, NY (US); Mayan Moudgill, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 747 days.

This patent is subject to a terminal disclaimer.

(21) Appl. No.: 10/713,502

(22) Filed: Nov. 15, 2003

(65) Prior Publication Data

US 2004/0103262 A1   May 27, 2004

Related U.S. Application Data

(62) Division of application No. 09/514,497, filed on Feb. 29, 2000, now Pat. No. 6,665,790.

(51) Int. Cl.
G06F 15/76 (2006.01)
G06F 15/82 (2006.01)
G06F 15/80 (2006.01)

(52) U.S. Cl. .................. 712/5; 712/7; 712/22
(58) Field of Classification Search .......... 712/4, 712/5, 8, 9, 18, 22, 6, 7; 711/217
See application file for complete search history.

(56) References Cited

U.S. PATENT DOCUMENTS

| | | | | |
|---|---|---|---|---|
| 4,888,679 A | * | 12/1989 | Fossum et al. | 712/6 |
| 5,392,443 A | * | 2/1995 | Sakakibara et al. | 712/9 |
| 5,528,550 A | * | 6/1996 | Pawate et al. | 365/230.03 |
| 5,560,035 A | | 9/1996 | Garg et al. | 395/800 |
| 5,669,013 A | * | 9/1997 | Watanabe et al. | 710/5 |
| 5,689,653 A | * | 11/1997 | Karp et al. | 712/222 |
| 6,266,758 B1 | | 7/2001 | van Hook et al. | 712/2 |
| 6,266,759 B1 | * | 7/2001 | Birrittella | 712/5 |
| 6,288,723 B1 | | 9/2001 | Huff et al. | 345/433 |
| 6,308,252 B1 | | 10/2001 | Agarwal et al. | 712/22 |
| 6,665,790 B1 | * | 12/2003 | Glossner et al. | 712/4 |

OTHER PUBLICATIONS

International Search Report dated (Feb. 23, 2004).

* cited by examiner

*Primary Examiner*—Daniel Pan
(74) *Attorney, Agent, or Firm*—Robert M. Trepp; F. Chau & Associates, LLC

(57) ABSTRACT

A system and method for processing operations that use data vectors each comprising a plurality of data elements, in accordance with the present invention, includes a vector data file comprising a plurality of storage elements for storing data elements of the data vectors. A pointer array is coupled by a bus to the vector data file. The pointer array includes a plurality of entries wherein each entry identifies at least one storage element in the vector data file. The at least one storage element stores at least one data element of the data vectors, wherein for at least one particular entry in the pointer array, the at least one storage element identified by the particular entry has an arbitrary starting address in the vector data file.

24 Claims, 5 Drawing Sheets

VECTOR REGISTER FILE WITH ARBITRARY VECTOR ADDRESSING

This is a divisional of application Ser. No. 09/514,497, filed Feb. 29, 2000 now U.S. Pat. No. 6,665,790.

BACKGROUND OF THE INVENTION

1. Field of the Invention

The present invention relates to digital processing, for example processing employing but not limited to multimedia processors, single instruction multiple data (SIMD) processors, digital signal processors with SIMD (Vector) processing capability, or similar devices, and more particularly, to vector register files used in digital processing to temporarily store inputs and outputs of computations.

2. Description of the Related Art

Single instruction multiple data (SIMD) processing is a powerful architectural concept having wide acceptance for computations involving media data or digital signal processing algorithms. It permits a single instruction to specify the computation on one or more streams of data values arranged as one dimensional vectors. Data are specified for the computation as coming from memory or from a register file typically holding vectors in one dimensional sequential order. Elements of the vector are accessed for the computation either sequentially (i.e., element 1, 2, 3 . . . ) or by stride (i.e., a fixed increment). However, many algorithms require irregular access to vector elements, either because of table-lookup like algorithms or because the elements require some address permutation, such as bit reversal. Typically, accesses of this type are performed one element at a time to form a new vector in the file which is then accessed sequentially. The performance of an algorithm which must be implemented in this manner is much less than would be possible for true SIMD processing.

Therefore, a need exists for a vector register architecture which permits all these modes of operation in the same structure to optimize performance.

SUMMARY OF THE INVENTION

A system and method for processing operations that use data vectors each comprising a plurality of data elements, in accordance with the present invention, includes a vector data file comprising a plurality of storage elements for storing data elements of the data vectors. A pointer array is coupled by a bus to the vector data file. The pointer array includes a plurality of entries wherein each entry identifies at least one storage element in the vector data file. The at least one storage element stores at least one data element of the data vectors, wherein for at least one particular entry in the pointer array, the at least one storage element identified by the particular entry has an arbitrary starting address in the vector data file.

In alternate embodiments, for any given entry in the pointer array, the at least one storage element identified by the any given entry may include an arbitrary starting address in the vector data file. The pointer array may include at least one entry which is updated based on data read out from at least one data element in the vector data file. The pointer array may include at least one entry which is updated based on data generated by incrementing data read from at least one entry of the pointer array. The pointer array may include at least one entry which is updated based on data generated by performing an increment operation on data read from at least one entry of the pointer array. The pointer array may further include at least two entries which are updated as part of a same logical operation. The increment operation may include at least one of a modulo operation and a stride operation. Each entry of the pointer array may include a starting address of at least one storage element in the vector data file.

In still other embodiments, the storage elements of the vector data file may be logically organized in a matrix of rows and columns, and each entry of the pointer array may include an address representing the row and column of at least one element in the vector data file. The storage elements of the vector file data may be logically organized in a matrix of rows and columns, and each array of the pointer array may include an address representing the row and column of a single element in the vector data file. For any given entry in the pointer array, the at least one storage element identified by the any given entry may be independent with respect to the at least one storage element identified by other entries of the pointer array.

A method for processing operations that use data vectors each comprising a plurality of data elements, the method includes providing a vector data file comprising a plurality of storage elements for storing data elements of the data vectors, and providing a pointer array having a plurality of entries. Each entry identifies at least one storage element in the vector data file for storing at least one data element of the data vectors, and for at least one particular entry in the pointer array, the at least one storage element identified by the particular entry has an arbitrary starting address in the vector data file.

In other methods, for any given entry in the pointer array, the at least one storage element identified by the any given entry may have an arbitrary starting address in the vector data file. The method may further include the step of updating at least one of the entries of the pointer array based on data read out from at least one data element in the vector data file. The method may also include the step of updating at least one of the entries of the pointer array based on data read out from data generated by incrementing data read from at least one entry of the pointer array. The method may also include the step of updating at least one of the entries of the pointer array based on data generated by performing an increment operation on data read from at least one entry of the pointer array. At least two entries of the pointer array may be updated as part of a same logical operation.

In still other methods, the increment operation may further include at least one of a modulo operation and a stride operation on data read from at least one entry of the pointer array. Each entry of the pointer array may store a starting address of at least one storage element in the vector data file. The storage elements of the vector data file may be logically organized in a matrix of rows and columns, and each entry of the pointer array may store an address representing the row and column of at least one element in the vector data file. The storage elements of the vector file data may be logically organized in a matrix of rows and columns, and each array of the pointer array may store an address representing the row and column of a single element in the vector data file. For any given entry in the pointer array, the at least one storage element identified by the any given entry may be independent with respect to the at least one storage element identified by other entries of the pointer array. The above method steps may be implemented by a program storage device readable by machine, tangibly embodying a program of instructions executable by the machine to perform these method steps for processing operations that use data vectors each comprising a plurality of data elements.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention provides a vector register file to include vector data, preferably for single instruction multiple data (SIMD) processing. The present invention also provides a register file for accessing an arbitrary subvector of the vectors included therein. The present invention will be described in terms of a processor circuit having components with a predetermined number of elements, address lines or components of a given size. These sizes of components or vectors, addresses, number of inputs, number of outputs, number of elements, etc. are illustrative only, and should not be construed as limiting the invention.

In one illustrative embodiment of the present invention, a vector register file is disclosed which is organized for holding one or more vectors of total size equal to or less than 512 elements where each access reads or writes 4 elements of 16 bits. Vectors are data structures composed of linear arrays of elements representing quantities. Addresses for access into the vector register file are specified by address pointers included in an integral but separately accessed pointer array. Each pointer specifies the address of one element of the four which can be read or written for each access cycle on each access port. The pointer file includes a multiplicity of pointers. The needed number of pointers, for example, four, for each access are selected by information included in the instruction controlling the SIMD processing program. The register file is therefore of the indirectly addressed type. After being used to determine the access address for the vector data array portion of the file, the contents of the pointer array portion may be updated (under instruction control), for example, with an incremented value (to allow sequential access of the vector), or the contents of the vector read (to allow table lookup access or data gathering accesses). Other embodiments of the present invention also provide updates for stride accesses, modulo (circular) access, or for other access methods. The programs of the present invention permit the calculation of address values and the loading of the updated values into the pointer address file for use.

It should be understood that the elements shown in FIGS. 1-5 may be implemented in various forms of hardware, software or combinations thereof. These elements may be implemented in software on one or more appropriately programmed general purpose digital computers or storage devices having a processor and memory and input/output interfaces. The present invention may also be implemented in hardware. When implemented in hardware, computations, including address updates, may be advantageously handled as pipelined operations at a full pipeline rate.

Figure 1:
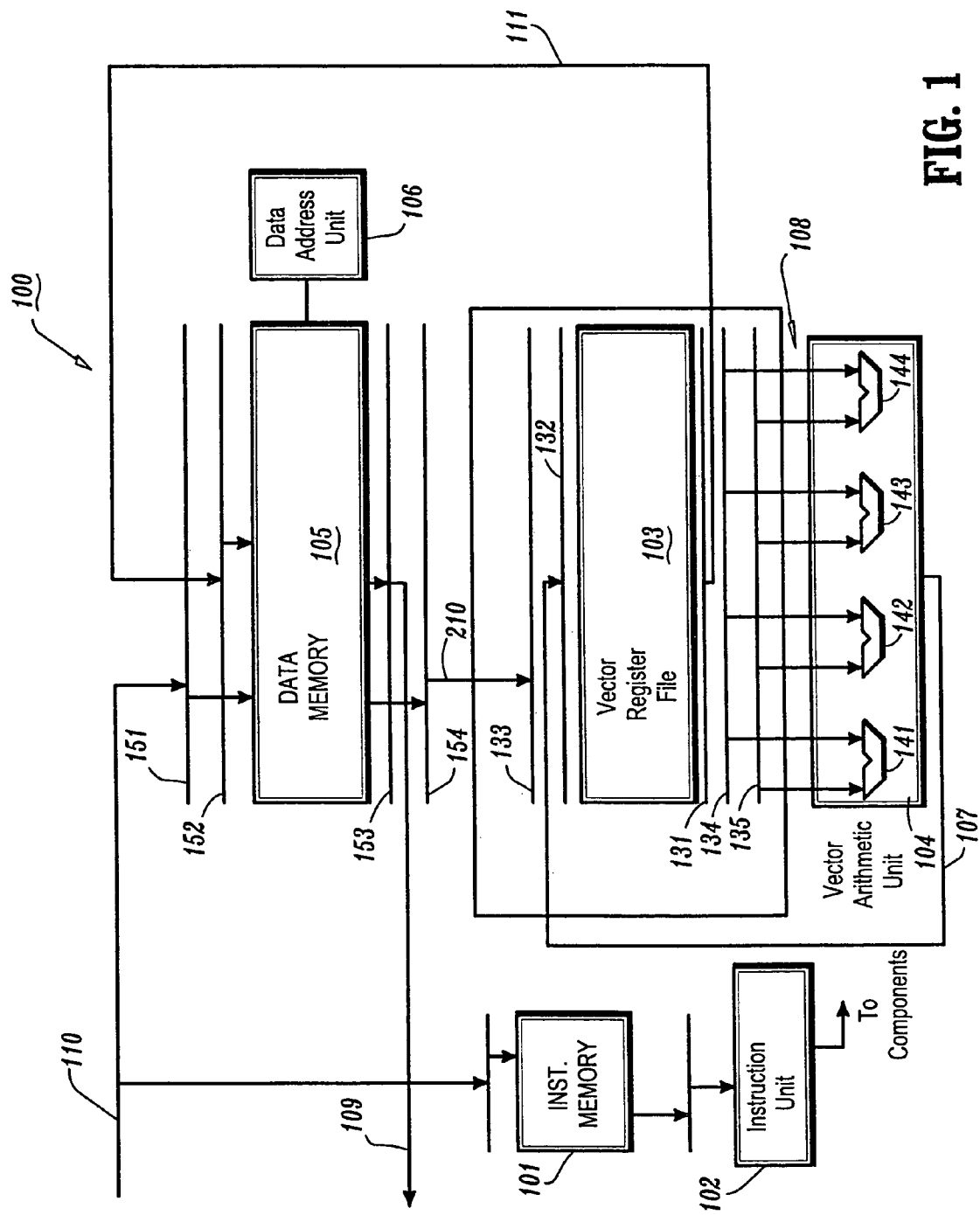
FIG. 1 is a schematic diagram showing a single instruction multiple data (SIMD) digital signal processor (DSP) or a media processor employing the present invention.

Referring now to the drawings in which like numerals represent the same or similar elements throughout the FIGS. and initially to FIG. 1, an illustrative processor 100 is shown. Processor 100 may include a media processor, SIMD processor or digital signal processor (DSP) which preferably includes an instruction memory 101 which provides instructions to an instruction unit 102. Instruction unit 102 sequences a program stored, for example, in instruction memory 101, and provides decoded controls to other elements or components of processor 100. Data to be processed are held in a multiported data memory 105 having, for example, two read data ports 153 and 154, and two write data ports 151 and 152, each of which is accessed with addresses provided by a data address unit 106. Data are moved from memory 105 via read port 154 to write port 133 of a vector register file 103 for use by vector register file 103 via write port 132 for use by vector arithmetic unit 104. Results of the computations are stored in vector register file 103 via write port 132. The file stored in vector register file 103 may be used for further computations or moved to data memory 105 via read port 131 to bus 111 and write port 152. Programs and input data for processor 100 are provided from external memory or I/O devices over input 110 and results are sent to external memory or I/O via an output bus 109.

Each of arithmetic units 141-144 operates on one element of each of two subvectors read from register file 103 via read ports 134 and 135, each arithmetic unit 141-144 may perform an identical function with the others. A four element subvector of results is produced which is then written back to the register file 103 via write port 132. The computation performed in unit 104 can proceed faster if a desired subvector is more easily selected over each of the ports 132, 134, 135.

Figure 2:
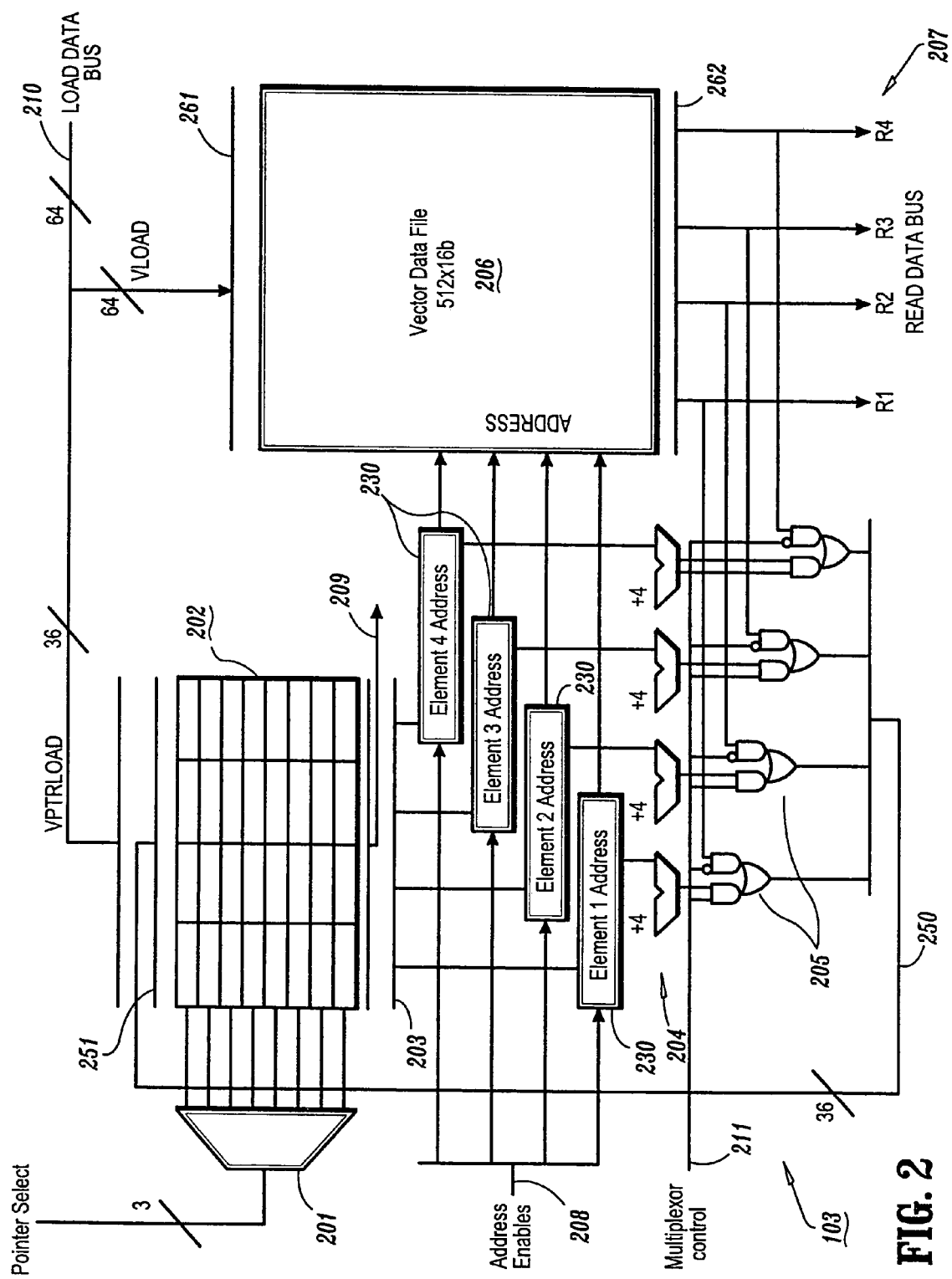
FIG. 2 is a schematic diagram showing one embodiment of a vector data file for vectors of 16 bit elements which includes an 8 entry pointer address file, 512 entry vector data file, and access for one arbitrary subvector of 4 elements in accordance with the present invention.

Referring to FIG. 2, vector register file 103 (FIG. 1) is now described in greater detail. Vector register file 103 includes logic for one of the access ports 131-135 (FIG. 1). It is noted that for simplicity data bus 207 in FIG. 2 represents one of two data busses shown as 108 in FIG. 1. Also, input port 210 is one of the two input ports 131 or 132 shown in FIG. 1. A vector address pointer array 202 is illustratively composed of, for example, eight words, each of which is composed of four fields of nine bits. Vector address pointer array 202 is addressed by a three bit address (Pointer Select) generated by instruction unit 102 of the processor 100 (FIG. 1) which selects one word of eight by a word decoder 201. The vector data are included in a vector data file 206 which, in one embodiment, includes 512 elements of 16 bits each. Bus 210 is used to load pointer words and a data file from either data memory 105 or vector arithmetic computation results from arithmetic unit 104 (FIG. 1). Data read from the vector data file 206 are composed of four concatenated vector elements R1, R2, R3, R4 which are put on a read data bus 207 for use by vector arithmetic units 104 or for storage in the data memory 105 (FIG. 1). Thirty-six bits of the 64 bits read from the vector data file 206 are also coupled to a first input of 36 multiplexors 205 (shown illustratively as four groups e.g., of 9 multiplexers) for use in address updating as will be described below.

The address used to select each one of the four vector elements (R1-R4) composing each read or write operation of the vector data file 206 comes from one of the fields of a vector pointer word read from the vector pointer array 202 via read bus 203. Each field is logically ANDed with the appropriate enable 208 generated by the instruction unit 102 (FIG. 1) to form the address used to access the vector data file 206. The enabled addresses are simultaneously coupled to the input of an increment-by-4 array 204. The incremented addresses are connected to a second input of multiplexors 205. The selection between the first and second input of multiplexors 205 is made by a multiplexor control signal 211. The output of multiplexors 205 is connected to the input of the address pointer array 202 so that the output can be written into the array 202. Pointer data words read from the pointer array 202 may be sent to data memory 105 (FIG. 1) via bus 209. One skilled in the art of array logical design can see that this arrangement of incrementing the address pointer value after use to address the data array (post incrementing) can be modified to increment prior to use by coupling incrementer array 204 directly to the output of read bus 203 and connecting their outputs to the address enable stages 230 (pre-incrementing).

The element space (e.g., 512 words) of the vector data file 206 is subdivided and allocated, preferably by software, to the data vectors needed by a particular algorithm being implemented. The values put into a vector pointer file stored in pointer array 202 define a starting address of each of up to 8 vectors. The values are loaded into the pointer array 202 preferably using a program instruction, for example, VPTRLOAD. With reference to FIG. 2, the execution of the instruction VPTRLOAD places values to be loaded onto bus 210 and the address of the pointer word to be loaded onto the "pointer select" input to the word address decoder 201. The value placed onto bus 210 may come from data memory 105, or be the result output of an arithmetic or logical computational unit 104 (FIG. 1).

Figure 3:
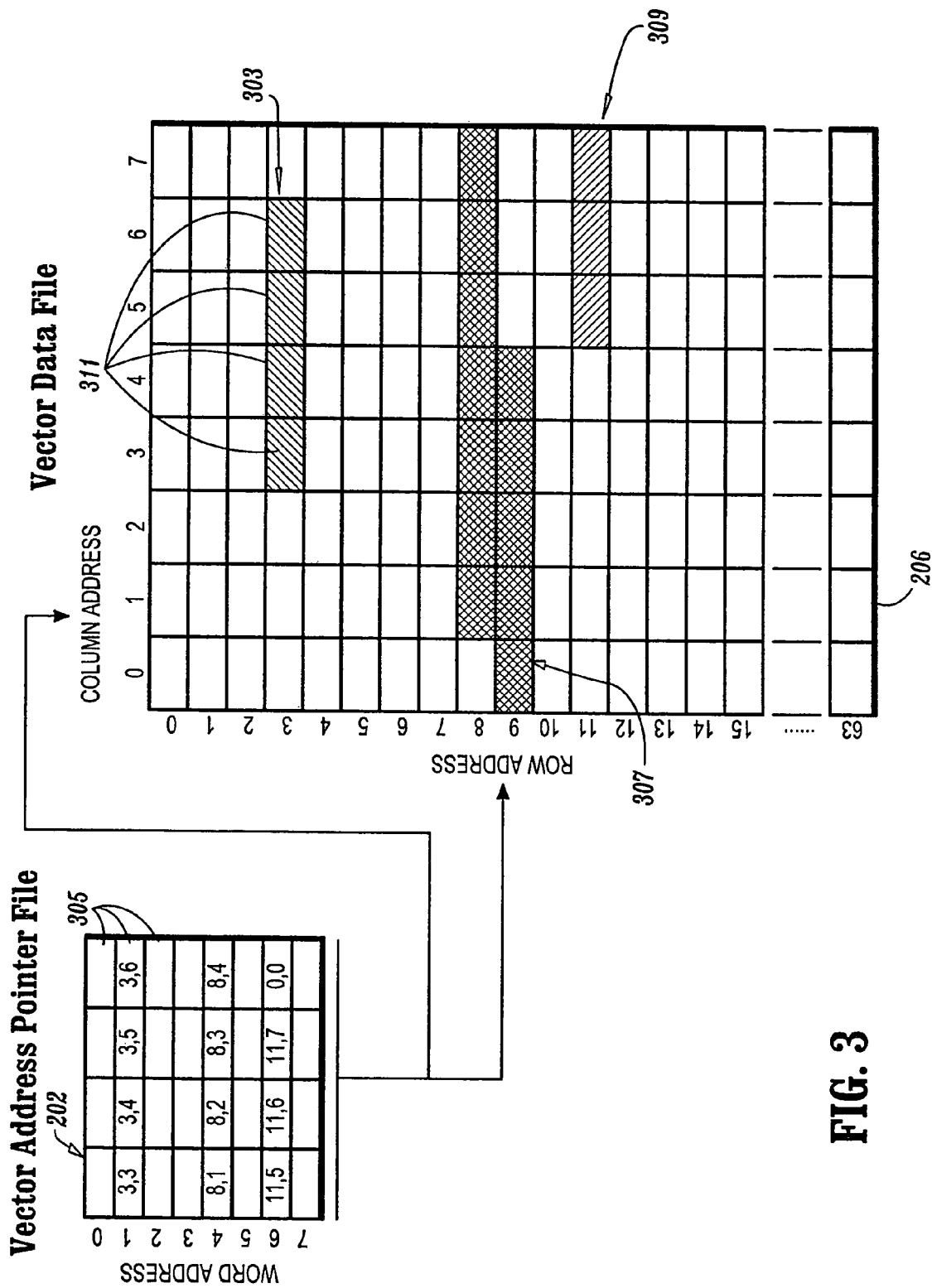
FIG. 3 shows an illustrative example of a data register partition including three vectors in accordance with the present invention.

Referring to FIG. 3, an example partitioning of one embodiment of the vector data file 206 is shown holding 3 small vectors. A 9 bit address of each element is composed of a row address of 6 bits (64 rows) and column address of 3 bits (8 columns). A first vector 303 in the example is composed of 4 elements 311 with the first element in row 3, column 3. The second element is in row 3, column 4 and so on. To address vector 303, the vector pointer array 202 is set, preferably by a software program. The program has set up word address "1" of the pointer array to point to the 4 elements of vector 303. In the vector address pointer file 202, 36 bits of word address "1" are divided into 4 fields 305 of 9 bits which have been initialized as shown in FIG. 3. The values in each field 305 of the pointer are illustratively shown as row, column values although a 9 bit binary number (or other sized word) would actually be stored. For example, the element address of the element at 3,3 is actually stored as binary 000011011. A second vector 307 has 12 elements starting at 8,1. Pointer word address "4" is used to address the starting 4 elements of this vector with the values shown. A third vector 309 is composed of 3 elements with the first at location 11,5 and the others as shown. Since there is no fourth element, the fourth pointer field is set to 0,0 although it is a don't care.

For the embodiment shown illustratively in FIG. 2, the basic operations on the vector data file 206 include, for example, sequential read, sequential write, indirect read and indirect write. The indirect mode of access is one important feature of the present invention and permits the addressing of arbitrary collections of elements in the vector data file 206 to form subvectors. These subvectors may be used, for example, to do table lookups of vector values or to gather elements into subvectors for SIMD processing. Other uses of the present invention may include, for example, strip-mining of vectors. Strip-mining of vectors include assembling sub-vectors via indirect read and writing (storing) the resulting subvectors back into data memory 105 for later use in subsequent program steps, for e.g., filtering.

During a given logical cycle of operations on the vector register file 103 (FIG. 1), the following operations may be performed: an operation on the pointer array 202 is specified (read or write operation), an index (which is an address, e.g., a word address between 0 and 7) into the pointer array is provided, the 4 entries of the pointer array 202 corresponding to the supplied index are read from the pointer array 202, the 4 entries read from the pointer array are used to generate a set of addresses (4 shown) into the vector data file 206 (preferably, this is triggered by a set of 4 address enable signals 208 as shown), the elements of the vector data file 206 corresponding to the supplied set of addresses are read from the vector data file 206, and control signals are provided to selectively control the update of the entry in the pointer array corresponding to the supplied index. These control signals include at least a "putaway control" signal with a value of "yes" or "no" specifying, if equal to "yes," that the output value of multiplexers 205 on bus 250 are to be written back into pointer address array 202 via write port 251. The control signals also include a multiplexer control signal 211 to determine if the incremented address read from pointer file 202 corresponding to the supplied set of address enable signals 208 or the data read from the vector data register file 206 are to be coupled to the bus 250.

Referring again to FIG. 2, other operations (such as an increment operation, a stride operation or an increment-modulo addressing operation) may be performed on the set of addresses supplied by the vector address pointer file 202, and a multiplexor circuit 205 may be employed to selectively output the data resultants from such operations or the data read from the elements of the vector data file 206. In this case, the update of the entry in the pointer array (202) corresponding to the supplied index may use the data selectively output by the multiplexor circuit 205.

These operations are triggered by instructions which include operations on vector data in vector register file 103. Specifications for the source of the data on bus 210 and the destination of data on buses 209 and 207 are also derived from the instruction stream.

Sequential vector read begins with a starting address in one of the 8 address words (0-7) in the pointer array 202. For illustrative purposes, the vector file 206 partitioning shown in FIG. 3 will be used and the read of the second vector 307 will be described to illustratively explain further features and details of the present invention.

With reference to FIGS. 1, 2 and 3, the first cycle of operation specifies a read of word address "4" of the pointer array 202, an enable of all 4 addresses, a read of the vector data file 206, a multiplexor control 211 value of 1 (e.g., select left leg of multiplexor), and a "yes" putaway value. The putaway value is a bit from an instruction specifying whether the output of multiplexers 205 are to be written back into pointer address array 202. The putaway value is implemented as a control signal which determines if the value on bus 250 is to be written into pointer array 202 via write port 251. This will result in the first 9 bits of the vector pointer word address "4" being the address of a first subvector element read from the vector data file 206. The element at 8,1 in the vector data file 206 is read and placed on R1 of bus 207. Similarly, the second field in pointer word "4" specifies that the element at 8,2 in the data file be read and placed on R2 of bus 207, similarly for the third and fourth elements. The four 16 bit data values read (R1-R4) are assembled into a subvector and passed via read data bus 207 to either the data memory 105 or the vector arithmetic unit 104. Simultaneously, the values read from pointer word "4" are incremented to the next sequential values (by adding 4, since 4 elements are processed at a time) by incrementers 204.

Since the multiplexor control 211 selects the incremented value and the putaway control specifies that the updated values are to be put back into the pointer array 202, the values (8,5), (8,6), (8,7) and (8,8) are stored back into the pointer file word address 4 via multiplexors 205. One skilled in the art understands that the addition of 4 (binary 000000100) to the value representing row 8 column 1 (binary 001000001) will result in binary 001000101 which is the representation of row 8 column 5 (8,5) and similarly for the other 3 values.

The control values for the next cycle of operation are identical to the first cycle but because the updated pointer values are used to access the vector data file 206, the next four elements of the vector are assembled and put onto bus 207. This identical control value is repeated for additional cycles (a total of 3 for this example) to sequentially read the entire element vector (12 elements in this case) and place the vector on bus 207.

Sequential writing or loading of a vector is very similar to reading. Using the second vector of FIG. 3 as an example again, the first cycle of operation which accesses data in the vector data file 206 specifies a read of word address 4 of the pointer array 202, an enable 208 of all 4 addresses, a write of the vector data file 206, a multiplexor control 211 value of 1 (e.g., select left leg), and a "yes" putaway control value. This value will result in the first 9 bits of the vector pointer word address "4" being the address of the first subvector element written into the data file 206. The first 16 bits of bus 210 are written into the element at 8,1 in the vector data file 206. Similarly, the second field in pointer word address "4" specifies that the element of 8,2 in the data file 206 is to be written with the second 16 bits from bus 210. Similarly for the third and fourth elements. The four 16 bit data values taken from the 64 bits on bus 210 are now written into the vector data file 206. Simultaneously, the value read from pointer word address "4" values are have been incremented to the next sequential values (by adding 4, since 4 elements are processed at a time) by incrementer 204. Since the multiplexor control 211 selects the incremented value and the putaway control value specifies that the updated values are to be put back into the pointer array 202, the values (8,5) (8,6) (8,7) and (8,8) and are stored back into the pointer file word address "4" via multiplexors 205. The identical control word is repeated twice more and the next two values on bus 210 are stored into the data file to make up a 12 element vector. The indirectly addressed modes of operation (indirect read and indirect write) may illustratively be used for the following:

1) arbitrary subvector access via a list of addresses stored as a vector in the vector data 206 file;
2) data directed access if the signal samples are placed into the pointer register 202, in this case, each signal value may access a vector element as is needed in many algorithms to select filter coefficients; and
3) data gather operations to convert scattered data into sequential SIMD processable data.

This is not an exhaustive list as the indirect commands may be employed for other tasks as well.

Figure 4:
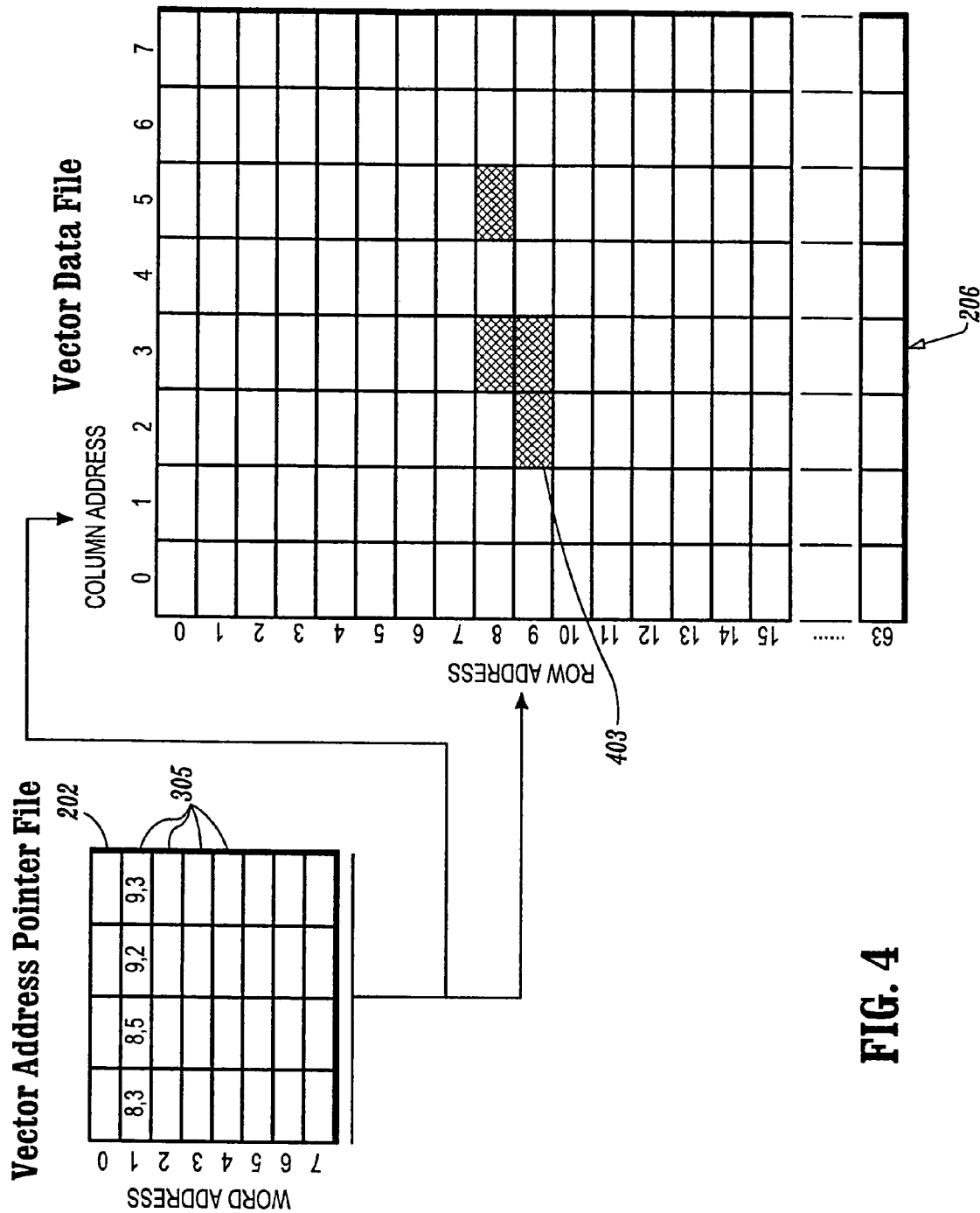
FIG. 4 shows another illustrative example of a data register partition for a vector in accordance with the present invention.

Indirect read will be described using the example partitioning shown in FIG. 4 with continued reference to FIG. 2. The four element first vector 403 includes the binary element values equivalent to the addresses (8,3), (8,5), (9,2), and (9,3) in a vector data file 206. The control for the first cycle of operation which accesses data in the vector register data file 206 specifies a read of word address "1" of pointer array 202, an enable 208 of all 4 addresses, a read of the vector data file 206, a multiplexor control value 211 of 0 (select right leg), and a "yes" putaway control value. This value will result in the 16 bit element in the vector data file 206 at location 8,3 being read from the vector data file 206 and placed on R1 of bus 207. Nine bits of this value are also coupled to the first of multiplexors 205. As stated above, these 9 bits have the binary value equivalent to the address of an element in the vector data file 206. Similarly, 9 bits of each of the values at the other 3 elements are coupled to multiplexor 205. Since the multiplexor selection control 211 specifies select right and the putaway control specifies "yes", the values contained in locations (8,3), (8,5), (9,2), and (9,3) are written into the four fields of pointer word address "1".

The second cycle of control specifies a read of word address "1" of the pointer array 202, an enable of all 4 addresses 208, a read of the vector data file 206, a multiplexor control value 211 of 0 (select right leg), and a "no" putaway control value. The second cycle of operation results in a read of the four elements whose addresses are now in pointer file word address "1" being read from the vector data file 206 and placed on bus 207. These are the four elements whose location in the vector data file 206 corresponds to the values in the low order 9 bits of locations (8,3), (8,5), (9,2), and (9,3) in the vector data file 206.

An indirect write ("data scatter") operation is controlled with a similar sequence. Note that the ability to perform a data scatter operation needs a 64 bit write port 261 (FIG. 2) to be sectioned into four 16 bit ports (64 bits total) such that each element address 230 can specify a write to any 16 bit data element in the vector data file 206. With this capability, element 1 address specifies where vector element R1 in the first 16 bits of the 64 bit bus 210 is written in data file 206, element 2 address specifies where vector element R2 in the second 16 bits of 64 bit bus 210 is written in data file 206, and so on for R3 and R4. A simplified embodiment may omit this capability for hardware cost reasons. In the described embodiment, the control for the first cycle of operation which accesses data in the vector register data file 206 specifies a read of word address "1" of the pointer array 202, an enable 208 of all 4 addresses, a read of the vector data file 206, a multiplexor control value 211 of 0 (select right leg), and a "yes" putaway control value. This reads the values in the 4 elements specified and writes the values back into the pointer array word address "1". The second cycle control specifies a read of word address "1" of the pointer array 202, an enable 208 of all 4 addresses, a write of the vector data file 206, a multiplexor control 211 value of 0 (select right leg), and a "no" putaway control value. This takes the four elements on bus 210 and places them in the four elements of the vector data file 206 specified by the addresses read in the first cycle.

The ability to specify the starting point of the computation in the data file using an arbitrary pointer makes it extremely easy and fast to "slide" one vector over another or itself for computations such as filtering and convolution.

One skilled in the art would understand that the logic for address generation and use shown in FIG. 2 can be duplicated for multi-port access of the vector data file 206. The first extension of the embodiment of FIG. 2 for multi-port operation is to make the Read and Write ports (262 and 261, respectively) of file 206 capable of simultaneous operation, i.e. a two port file with one port dedicated to read and the other dedicated to write. With such a structure, new data may be loaded into the vector data file 206 from bus 210 via write port 261 as old data is read by read port 262 and put on bus 207, processed and the results written back to data memory 105. This permits a vector of arbitrary size to be streamed through the processing units.

Figure 5:
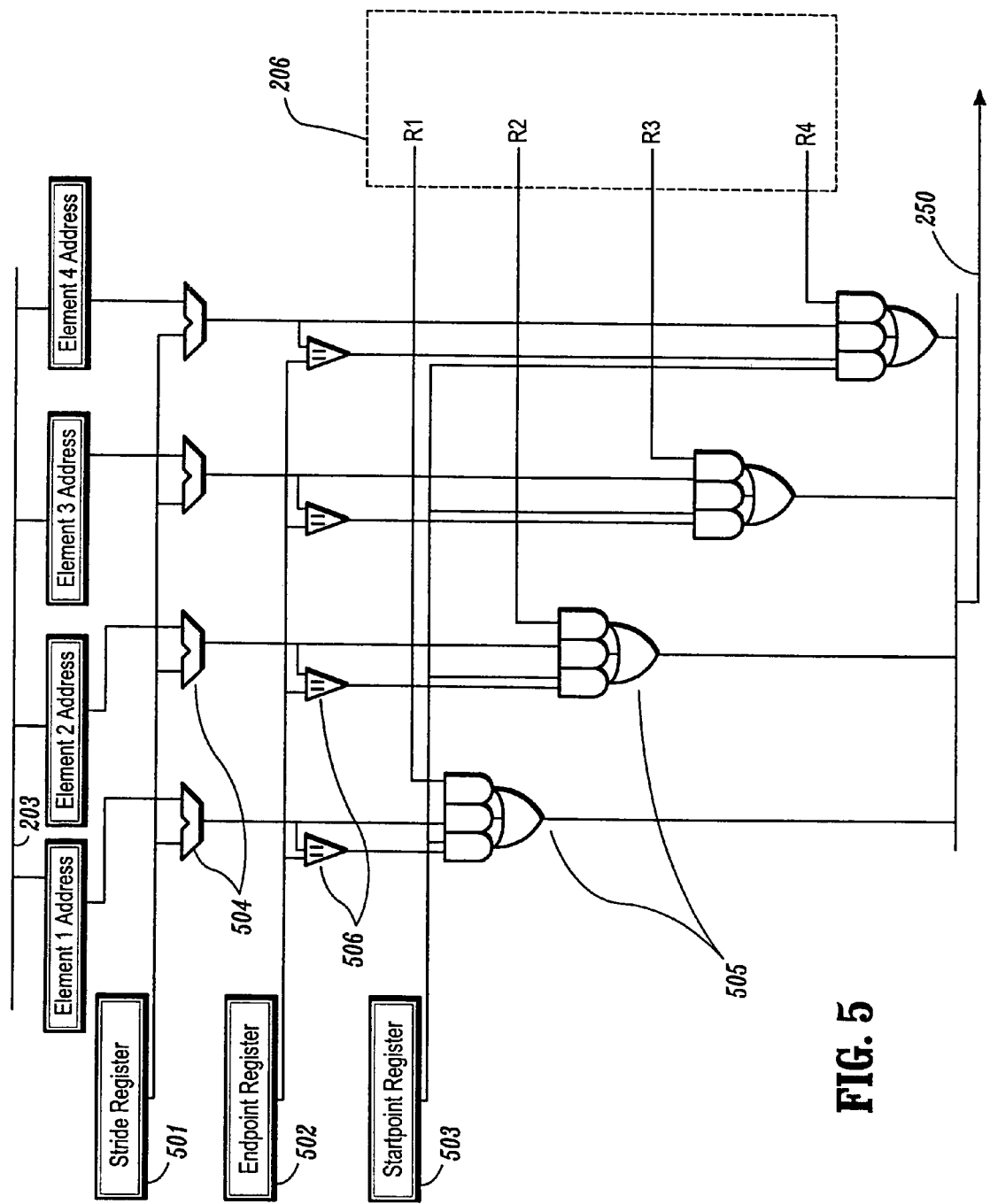
FIG. 5 is a schematic diagram of an alternative embodiment of the address incrementer showing new address multiplexors and stride and modulo addressing capability in accordance with the present invention.

Referring to FIG. 5, modifications to the embodiment of FIG. 2 are shown to provide for the other addressing modes, e.g., stride and modulo addressing. Other addressing modes may also be implemented using appropriate logic or software. The address incrementers 204 and multiplexors 205, in FIG. 2 may be replaced with the hardware shown in FIG. 5. Incrementers 504 and multiplexers 505 are included. The inputs include the element addresses 508 read from the pointer file (202), the vector data from the register file 206, the output is the updated address bus 250 which is stored in the pointer file 202. For stride accesses, a stride value is stored, preferably by a program, in stride register 501 and the accesses proceed as described for sequential access above. However, the stride value is added (or subtracted) to the pointer file value instead of the fixed value 4. Modulo (circular) addressing is performed by, for example, the program loading a starting address of the circular buffer in the Startpoint register 503 and in the pointer file 202 (FIG. 2). The end of the vector is loaded in an endpoint register 502. Operation proceeds using the stride register 501 value to increment the address as above. Each cycle, the compare equal circuits 506 compare the updated address with the endpoint address to see if the end of the vector has been reached. If it has, the multiplexor 505 is conditioned to provide the startpoint address from the startpoint address register 503 as the new address to the pointer file 202 instead of the updated address.

The present invention provides many advantages over the prior art. For example, due to the flexible addressing provided by the present invention, addressing of data memory 105 is simplified. Other advantages may include the following. Addressing of data for complex loops and table lookup can be easily specified in a few instructions, the present invention makes the size of programs smaller and therefore increases the efficiency of instruction memory 101. The present invention enables the capability for each element in the vector address file 206 to be able to include any address of any element in the data array 202 independent of the contents of any other element in the vector address file 206. For example, two elements can have the same address while any requirements that the addresses refer to sequential data elements in the data file are eliminated. Other advantages and benefits may be realized by the present invention.

Having described preferred embodiments of a vector register file with arbitrary vector addressing (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A computer processor having a vector register architecture for processing operations that use data vectors each comprising a plurality of data elements, the vector register architecture comprising:

a vector data file comprising a plurality of storage elements for storing data elements of the data vectors;

a pointer array electrically coupled by a bus to the vector data file, the pointer array including a plurality of entries wherein each entry identifies at least one storage element in the vector data file, wherein the entries are grouped into addressable words corresponding to individual data vectors stored in the vector data file, wherein the words are addressed by a word address decoder coupled to the pointer array;

the at least one storage element for storing at least one data element of the data vectors, wherein for at least one particular word in the pointer array, the at least one storage element identified by the particular word has an arbitrary starting address in the vector data file; and wherein the pointer array includes at least one word which is updated based on one of data read out from at least one data element in the vector data file and data generated by performing an increment operation on data read from at least one word of the pointer array, wherein the entries of the at least one word are updated as part of a same logical operation.

2. The system as recited in claim 1, wherein the increment operation includes at least one of a modulo operation and a stride operation.

3. The system as recited in claim 1, wherein each entry of the pointer array includes a staffing address of at least one storage element in the vector data file.

4. A computer processor having a vector register architecture for processing operations that use data vectors each comprising a plurality of data elements, the vector register architecture comprising a vector data file comprising a plurality of storage elements for storing data elements of the data vectors;

a pointer array electrically coupled by a bus to the vector data file, the pointer array including a plurality of entries wherein each entry identifies at least one storage element in the vector data file, wherein the entries are grouped into addressable words corresponding to individual data vectors stored in the vector data file, wherein the words are addressed by a word address decoder coupled to the pointer array;

the at least one storage element for storing at least one data element of the data vectors, wherein for at least one particular word in the pointer array, the at least one storage element identified by the particular word has an arbitrary starting address in the vector data file; and wherein the pointer array includes at least one word which is updated based on one of data read out from at least one data element in the vector data file and data generated by performing an increment operation on data read from at least one word of the pointer array, wherein the increment operation includes at least one of a modulo operation and a stride operation.

5. The system as recited in claim 4, wherein the pointer array includes at least two entries which are updated as part of a same logical operation.

6. A computer processor having a vector register architecture for processing operations that use data vectors each comprising a plurality of data elements, the vector register architecture comprising a vector data file comprising a plurality of storage elements for storing data elements of the data vectors;

a pointer array electrically coupled by a bus to the vector data file, the pointer array including a plurality of entries wherein each entry identifies at least one storage element in the vector data file, wherein the entries are grouped into addressable words corresponding to individual data vectors stored in the vector data file, wherein the words are addressed by a word address decoder coupled to the pointer array;

the at least one storage element for storing at least one data element of the data vectors, wherein for at least one particular word in the pointer array, the at least one storage element identified by the particular word has an arbitrary staffing address in the vector data file; and wherein the storage elements of the vector data file are logically organized in a matrix of rows and columns, and wherein each entry of the pointer array includes an address representing the row and column of at least one element in the vector data file.

7. A computer processor having a vector register architecture for processing operations that use data vectors each comprising a plurality of data elements, the vector register architecture comprising a vector data file comprising a plurality of storage elements for storing data elements of the data vectors;

a pointer array electrically coupled by a bus to the vector data file, the pointer array including a plurality of entries wherein each entry identifies at least one storage element in the vector data file, wherein the entries are grouped into addressable words corresponding to individual data vectors stored in the vector data file, wherein the words are addressed by a word address decoder coupled to the pointer array;

the at least one storage element for storing at least one data element of the data vectors, wherein for at least one particular word in the pointer array, the at least one storage element identified by the particular word has an arbitrary starting address in the vector data file; and wherein the storage elements of the vector file data are logically organized in a matrix of rows and columns, and wherein each array of the pointer array includes an address representing the row and column of a single element in the vector data file.

8. A computer processor having a vector register architecture for processing operations that use data vectors each comprising a plurality of data elements, the vector register architecture comprising a vector data file comprising a plurality of storage elements for storing data elements of the data vectors;

a pointer array electrically coupled by a bus to the vector data file, the pointer array including a plurality of entries wherein each entry identifies at least one storage element in the vector data file, wherein the entries are grouped into addressable words corresponding to individual data vectors stored in the vector data file, wherein the words are addressed by a word address decoder coupled to the pointer array;

the at least one storage element for storing at least one data element of the data vectors, wherein for at least one particular word in the pointer array, the at least one storage element identified by the particular word has an arbitrary starting address in the vector data file; and wherein, for any given entry in the pointer array, the at least one storage element identified by the any given entry is independent with respect to the at least one storage element identified by other entries of the pointer array.

9. A computer-implemented method for processing operations that use data vectors each comprising a plurality of data elements, the method comprising the steps of:

providing a vector data file comprising a plurality of storage elements for storing data elements of the data vectors, and providing a pointer array having a plurality of entries, wherein each entry identifies at least one storage element in the vector data file for storing at least one data element of the data vectors, wherein for at least one particular entry in the pointer array, the at least one storage element identified by the particular entry has an arbitrary starting address in the vector data file, wherein the entries are grouped into addressable words corresponding to individual data vectors stored in the vector data file, wherein the words are addressed by a word address decoder coupled to the pointer array; and updating at least one of the words based on one of data read out from at least one data element in the vector data file and data generated by performing an increment operation on data read from at least one entry of the pointer array, wherein the entries of the of the at least one word are updated as part of a same logical operation.

10. The computer-implemented method as recited in claim 9, wherein the increment operation further includes at least one of a modulo operation and a stride operation on data read from at least one entry of the pointer array.

11. The computer-implemented method as recited in claim 10, wherein at least two entries of the pointer array are updated as part of a same logical operation.

12. The computer-implemented method as recited in claim 9, wherein the increment operation farther includes at least one of a modulo operation and a stride operation on data read from at least one entry of the pointer array.

13. The computer-implemented method as recited in claim 9, wherein each entry of the pointer array stores a starting address of at least one storage element in the vector data file.

14. The computer-implemented method as recited in claim 9, wherein the storage elements of the vector data file are logically organized in a matrix of rows and columns, and wherein each entry of the pointer array stores an address representing the row and column of at least one element in the vector data file.

15. The computer-implemented method as recited in claim 9, wherein the storage elements of the vector file data are logically organized in a matrix of rows and columns, and wherein each array of the pointer array stores an address representing the row and column of a single element in the vector data file.

16. The computer-implemented method as recited in claim 9, wherein, for any given entry in the pointer array, the at least one storage element identified by the any given entry is independent with respect to the at least one storage element identified by other entries of the pointer array.

17. A program storage device readable by machine, tangibly embodying a program of instructions executable by the machine to perform method steps for processing operations that use data vectors each comprising a plurality of data elements, the method steps comprising:

providing a vector data file comprising a plurality of storage elements for storing data elements of the data vectors, and providing a pointer array having a plurality of entries, wherein each entry identifies at least one storage element in the vector data file for storing at least one data element of the data vectors, wherein for at least one particular entry in the pointer array, the at least one storage element identified by the particular entry has an arbitrary starting address in the vector data file, wherein the entries are grouped into addressable words corresponding to individual data vectors stored in the vector data file; and updating at least one of the words based on one of data read out from at least one data element in the vector data file and data generated by performing an increment operation on data read from at least one entry of the pointer array, wherein the entries of the of the at least one word are updated as part of a same logical operation.

18. The program storage device as recited in claim 17, wherein the increment operation further includes at least one of a modulo operation and a stride operation on data read from at least one entry of the pointer array.

19. The program storage device as recited in claim 17, wherein each entry of the pointer array stores a starting address of at least one storage element in the vector data file.

20. A program storage device readable by machine, tangibly embodying a program of instructions executable by the machine to perform method steps for processing operations that use data vectors each comprising a plurality of data elements, the method steps comprising:
providing a vector data file comprising a plurality of storage elements for storing data elements of the data vectors, and
providing a pointer array having a plurality of entries, wherein each entry identifies at least one storage element in the vector data file for storing at least one data element of the data vectors, wherein for each entry in the pointer array, the at least one storage element identified by the particular entry has an arbitrary starting address in the vector data file, wherein the entries are grouped into addressable words, each addressable word comprising the arbitrary starting addresses corresponding to the storage elements of an individual data vector stored in the vector data file; and
updating at least one of the words based on one of data read out from at least one data element in the vector data file and data generated by performing an increment operation on data read from at least one entry of the pointer array, wherein the increment operation further includes at least one of a modulo operation and a stride operation on data read from at least one entry of the pointer array.

21. The program storage device as recited in claim 20, wherein at least two entries of the pointer array are updated as part of a same logical operation.

22. A program storage device readable by machine, tangibly embodying a program of instructions executable by the machine to perform method steps for processing operations that use data vectors each comprising a plurality of data elements, the method steps comprising:
providing a vector data file comprising a plurality of storage elements for storing data elements of the data vectors;
providing a pointer array having a plurality of entries, wherein each entry identifies at least one storage element in the vector data file for storing at least one data element of the data vectors, wherein for at least one particular entry in the pointer array, the at least one storage element identified by the particular entry has an arbitrary starting address in the vector data file, wherein the entries are grouped into addressable words corresponding to individual data vectors stored in the vector data file,
wherein the storage elements of the vector data file are logically organized in a matrix of rows and columns, and wherein each entry of the pointer array stores an address representing the row and column of at least one storage element of a data vector in the vector data file; and
accessing the vector data file for the data vector, wherein the data vector is addressed according to a word address of the pointer array.

23. A program storage device readable by machine, tangibly embodying a program of instructions executable by the machine to perform method steps for processing operations that use data vectors each comprising a plurality of data elements, the method steps comprising:
providing a vector data file comprising a plurality of storage elements for storing data elements of the data vectors,
providing a pointer array having a plurality of entries, wherein each entry identifies at least one storage element in the vector data file for storing at least one data element of the data vectors, wherein for at least one particular entry in the pointer array, the at least one storage element identified by the particular entry has an arbitrary starting address in the vector data file, wherein the entries having arbitrary staffing addresses are grouped into addressable words corresponding to individual data vectors stored in the vector data file; and
wherein the storage elements of the vector file data are logically organized in a matrix of rows and columns, and wherein each entry of the pointer array stores an address representing the row and column of a single storage element in the vector data file; and
accessing the vector data file for the single storage element to execute an instruction of the program of instructions, wherein the single storage element is addressed according to the address of the pointer array.

24. A program storage device readable by machine, tangibly embodying a program of instructions executable by the machine to perform method steps for processing operations that use data vectors each comprising a plurality of data elements, the method steps comprising:
providing a vector data file comprising a plurality of storage elements for storing data elements of the data vectors,
providing a pointer array having a plurality of entries, wherein each entry identifies at least one storage element in the vector data file for storing at least one data element of the data vectors, wherein for each entry in the pointer array, the at least one storage element identified by the particular entry has an arbitrary starting address in the vector data file, wherein the entries are grouped into addressable words, each addressable word comprising the arbitrary starting addresses corresponding to the storage elements of an individual data vector stored in the vector data file;
wherein, for any given entry in the pointer array, the at least one storage element identified by the any given entry is independent with respect to the at least one storage element identified by other entries of the pointer array; and
performing a read or a write operation that addresses a vector in the vector data file via an index into the pointer array specifying an entry having a plurality of addresses corresponding to different elements of a vector in the vector data file, wherein the read or write operation accesses the vector to execute an instruction of the program of instructions.

* * * * *